E. W. LABOMBARDE.
TAPING MACHINE.
APPLICATION FILED OCT. 28, 1910.
1,161,228.
Patented Nov. 23, 1915.
10 SHEETS—SHEET 9.
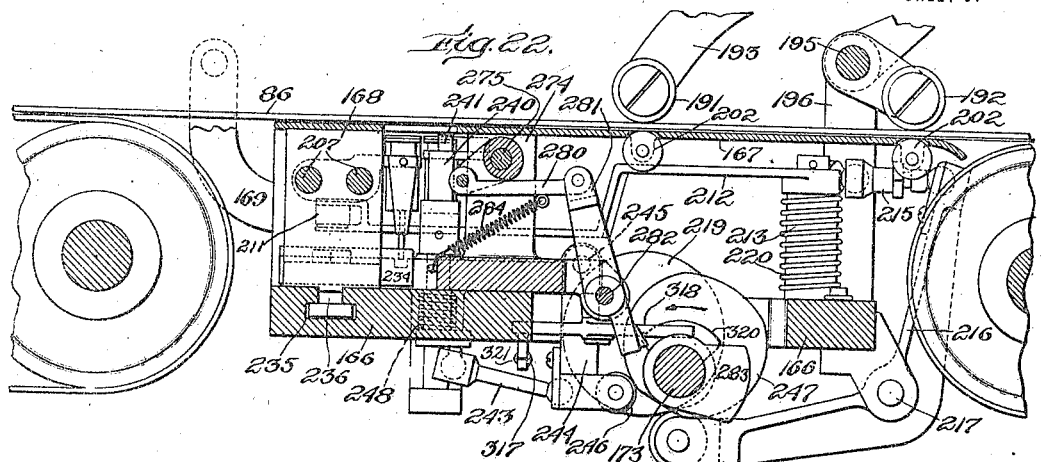
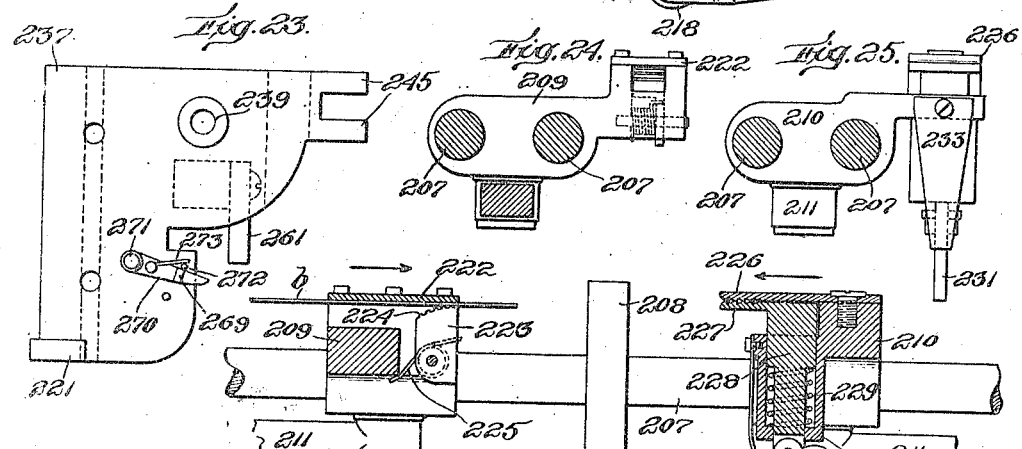
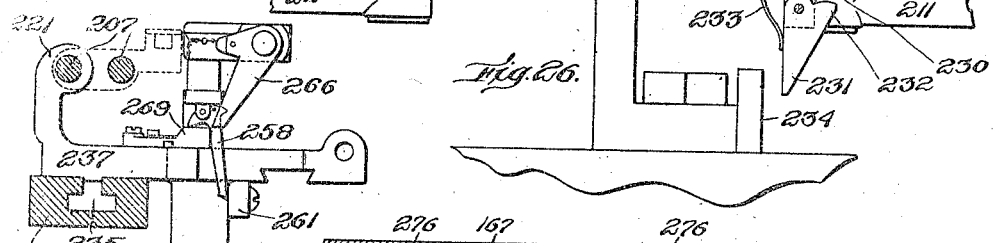
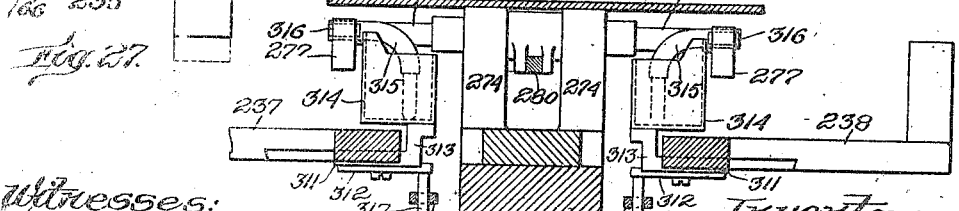

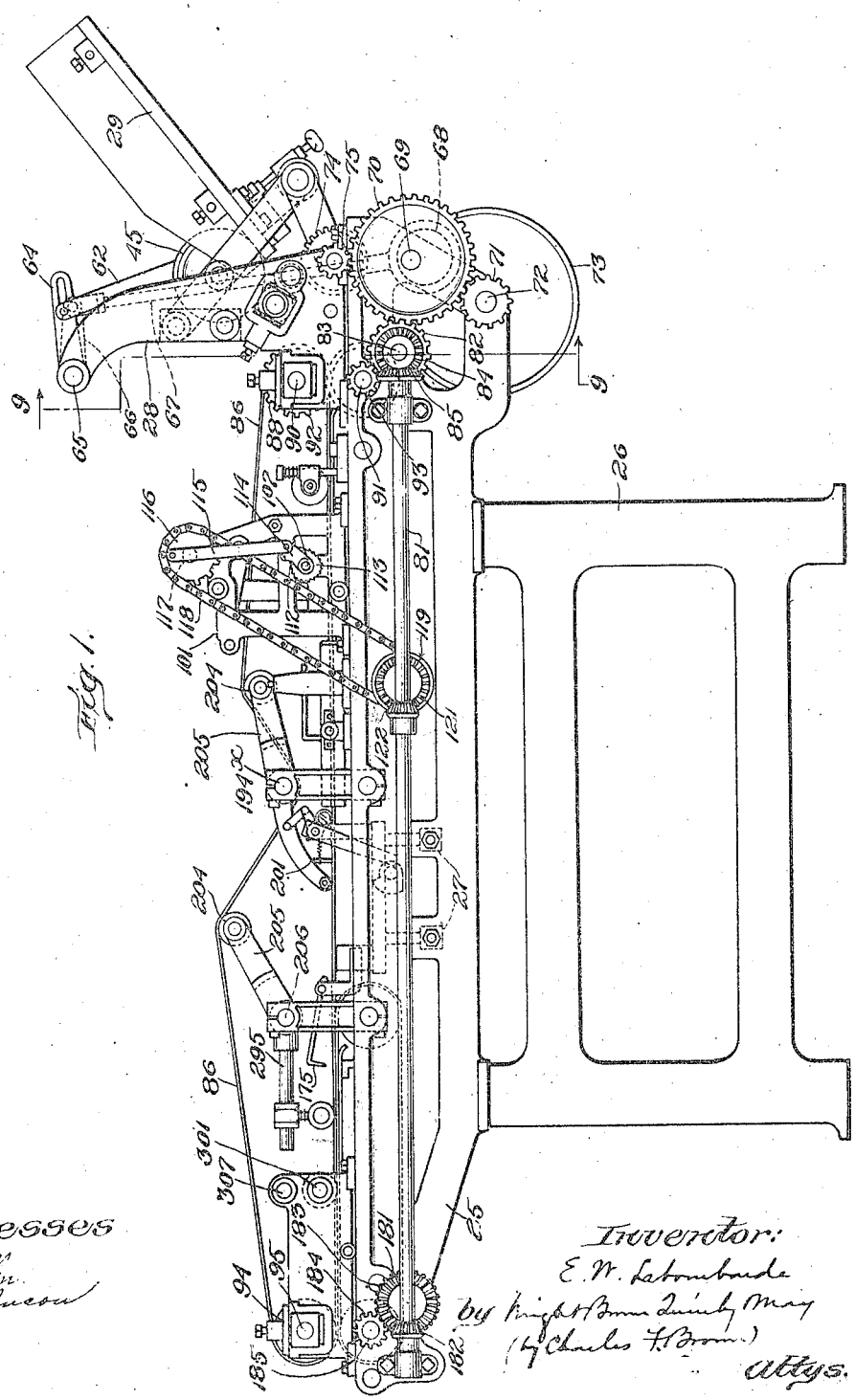

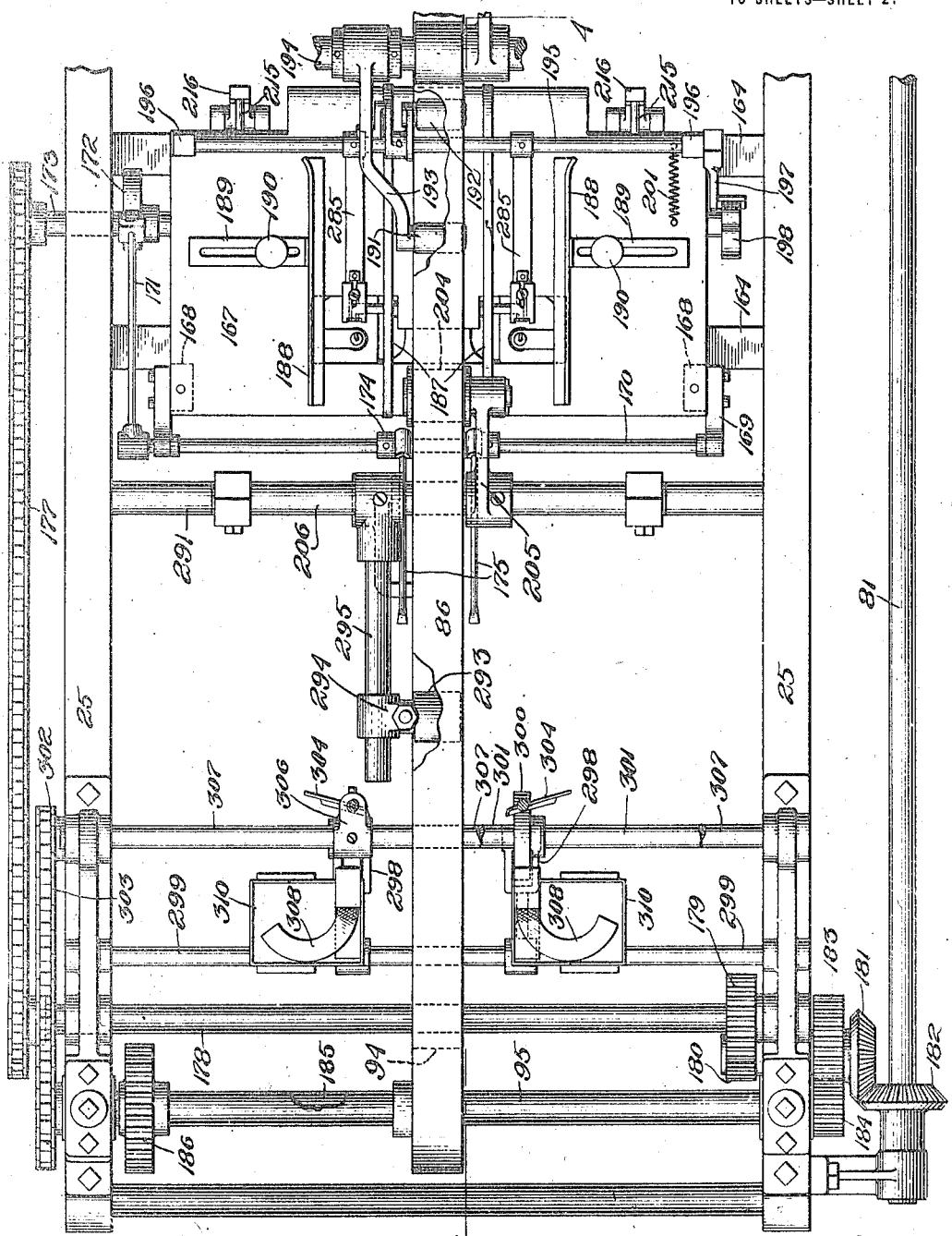

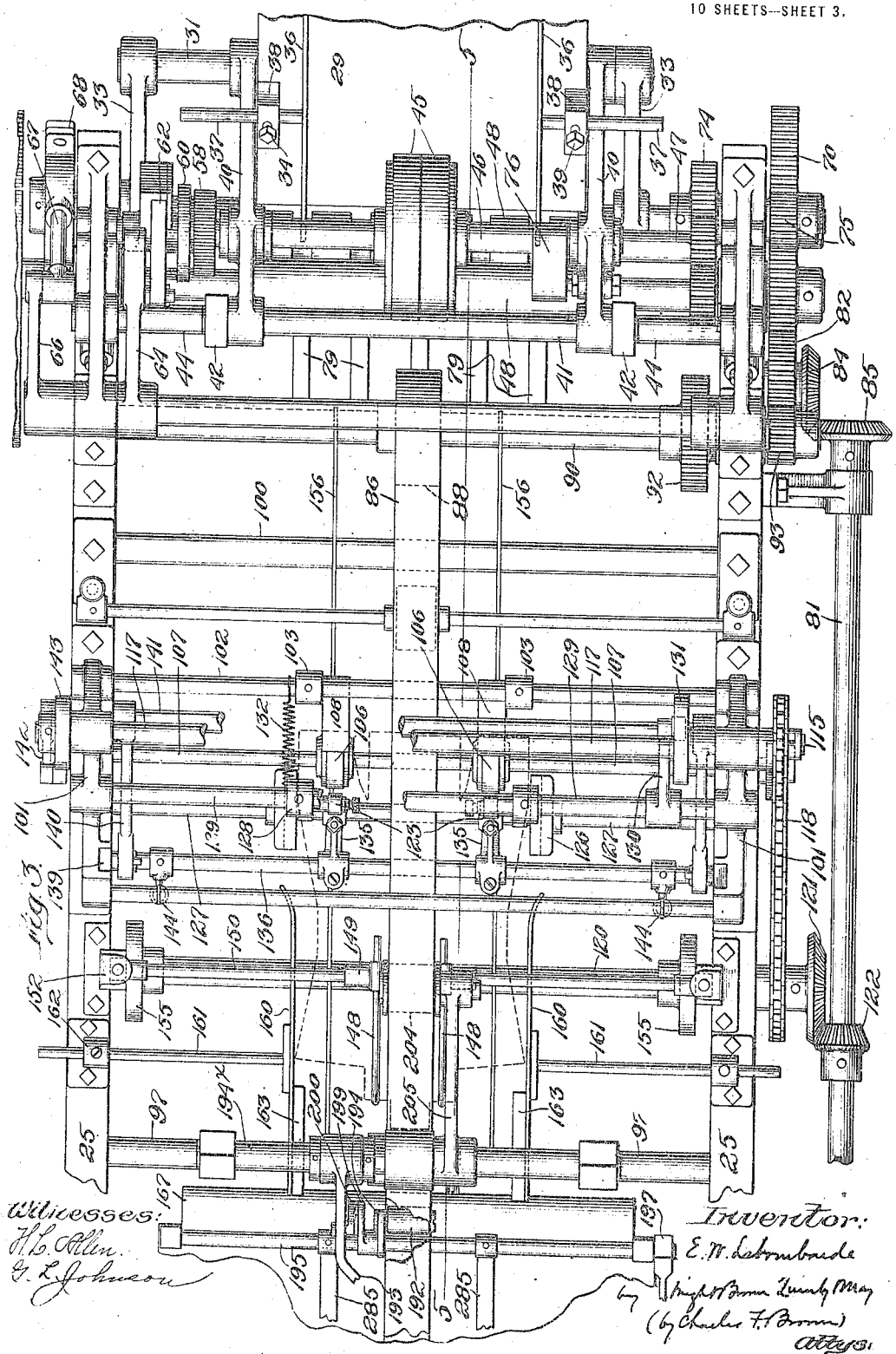

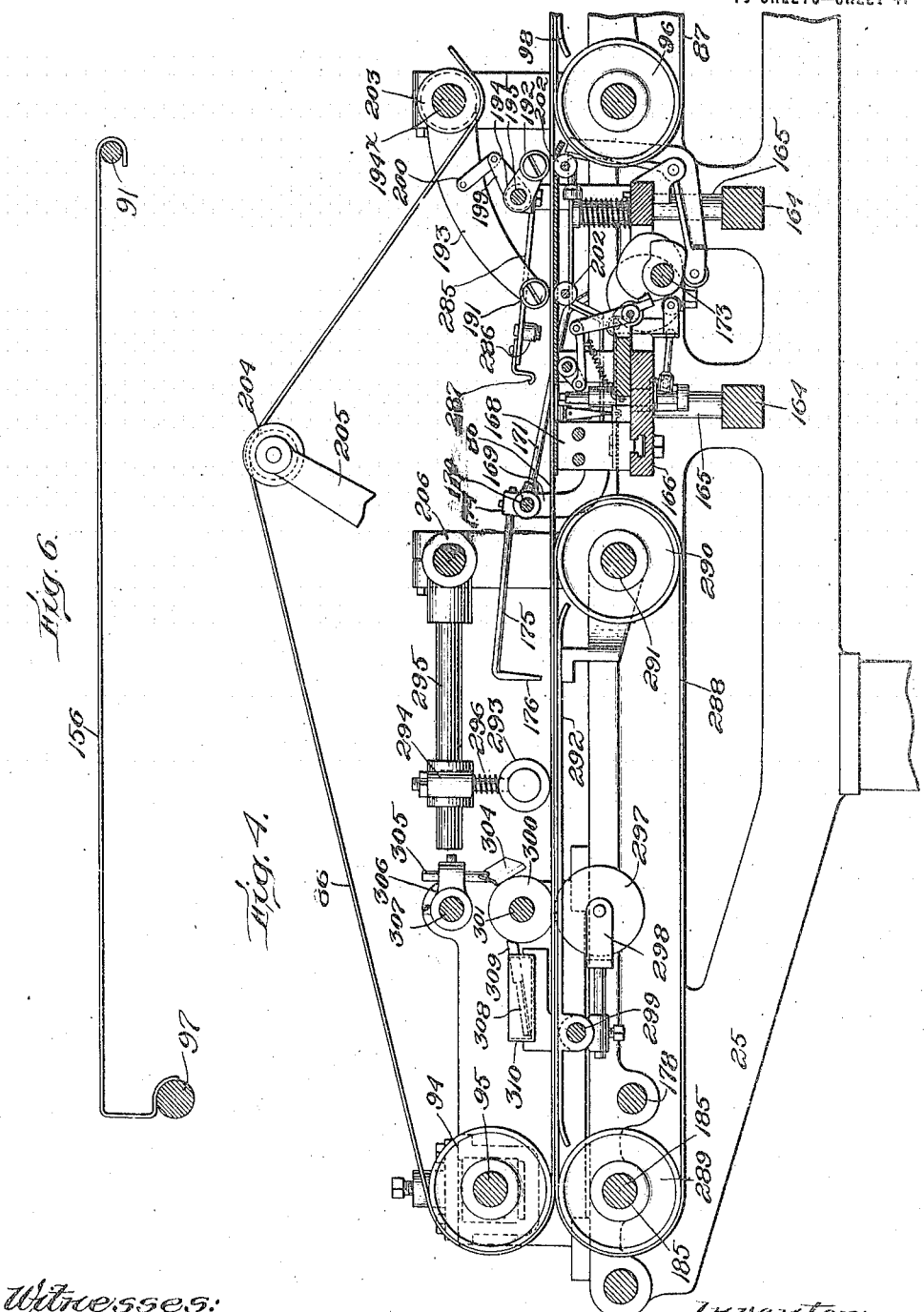

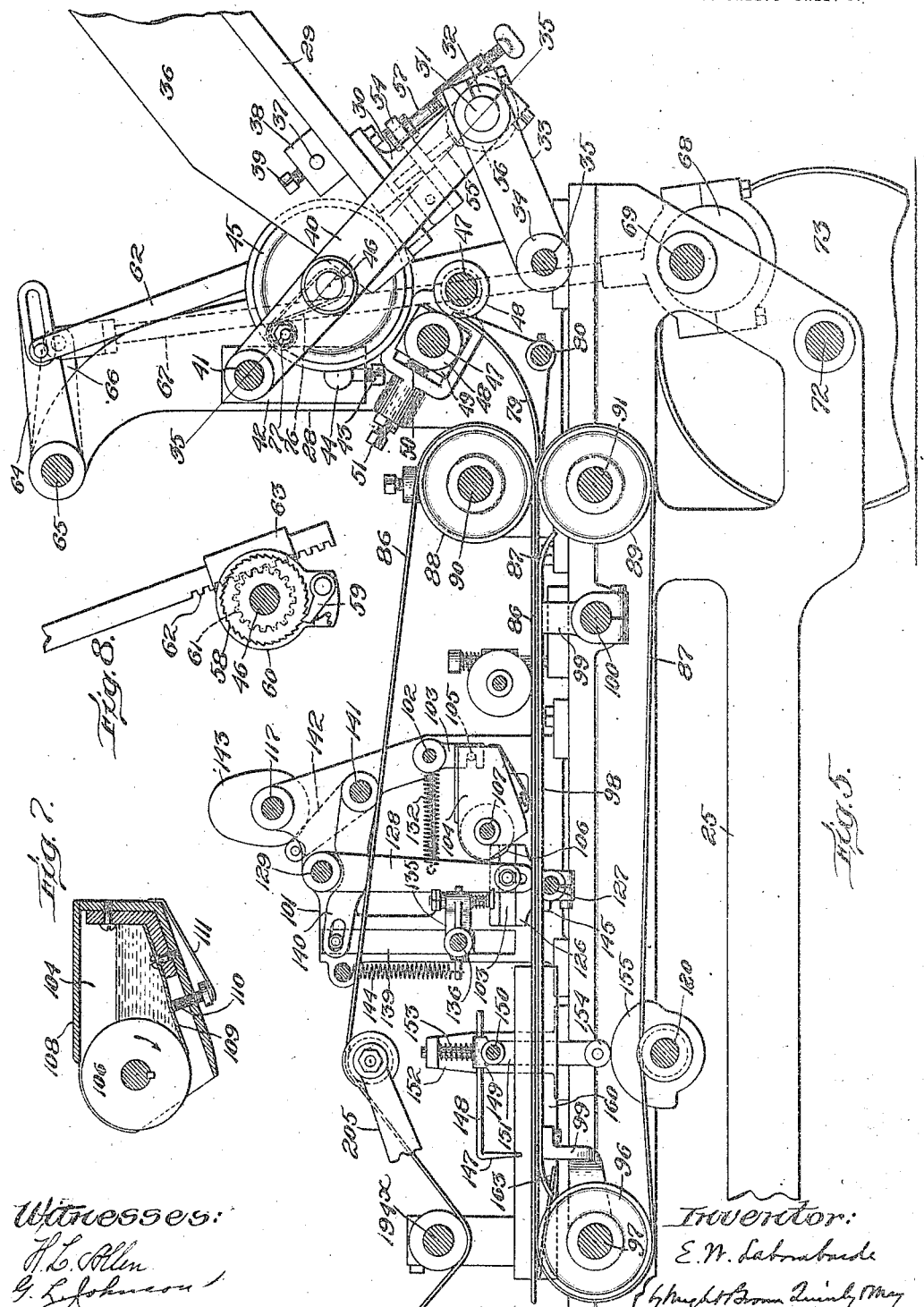

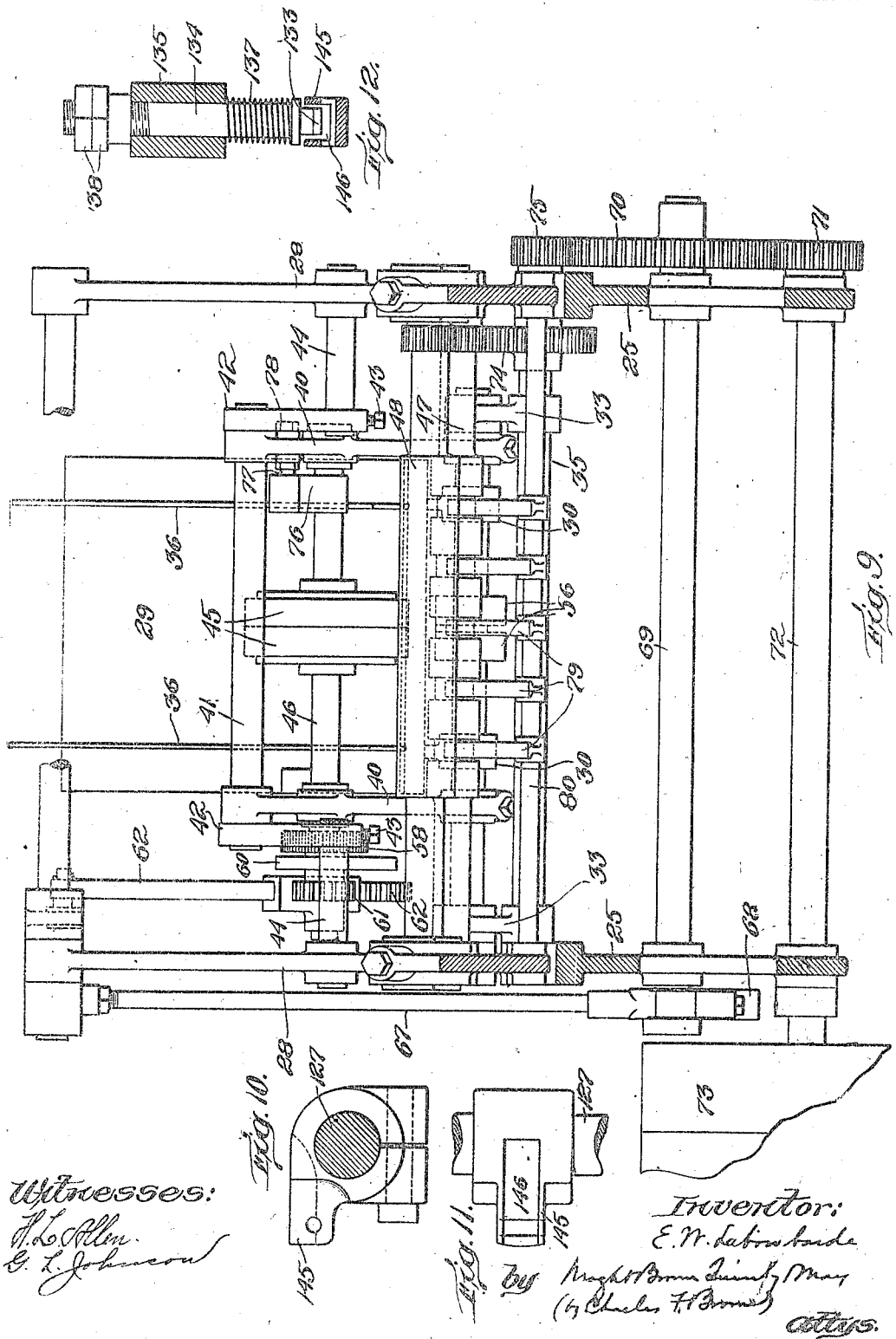

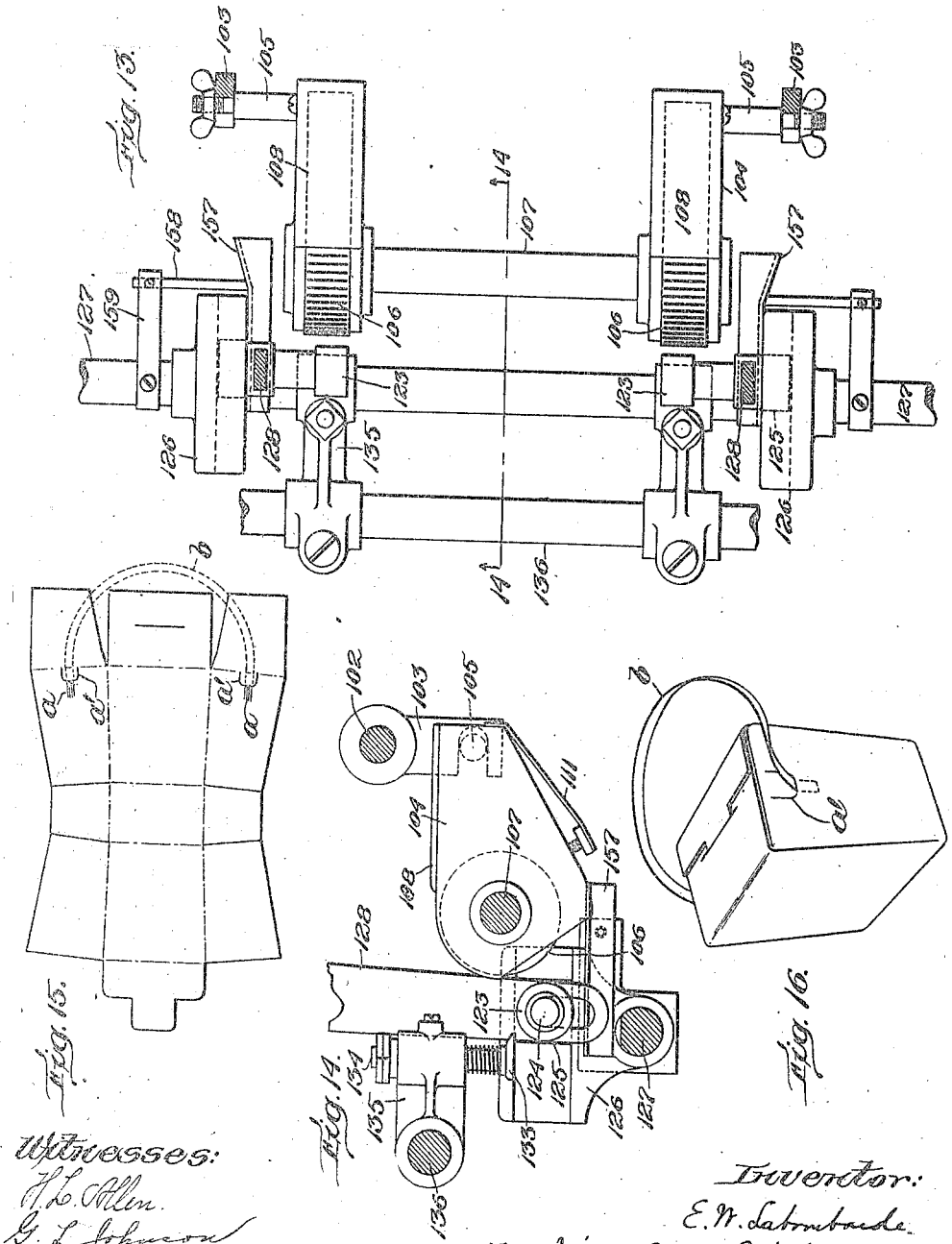

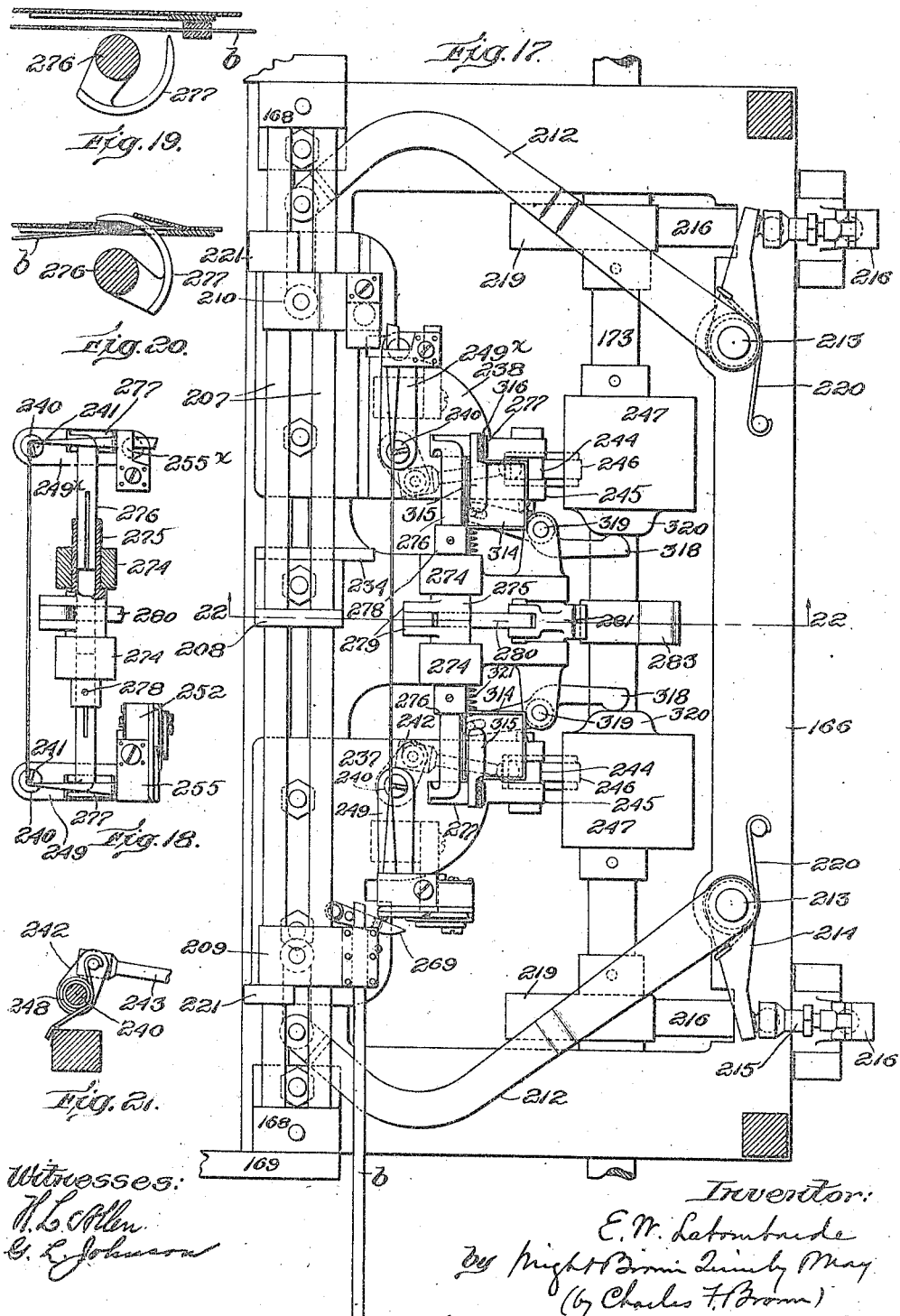

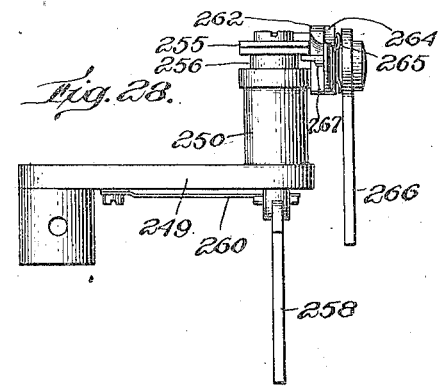
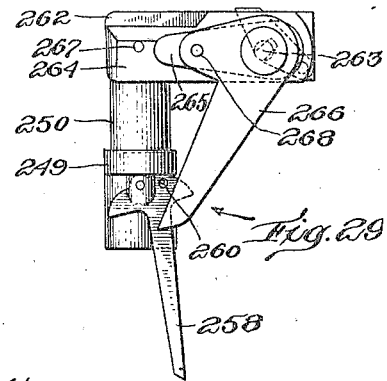
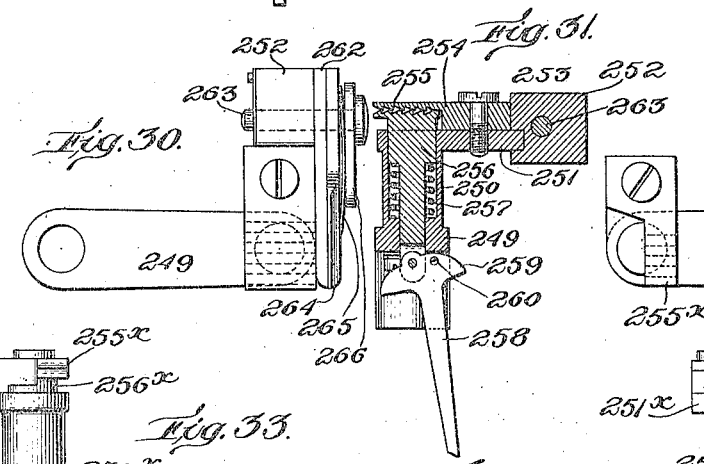
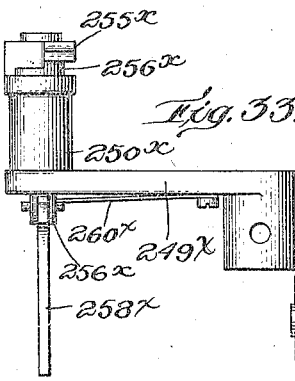
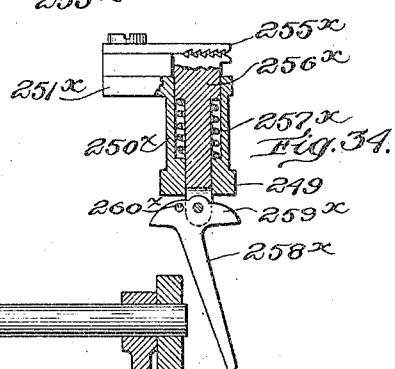
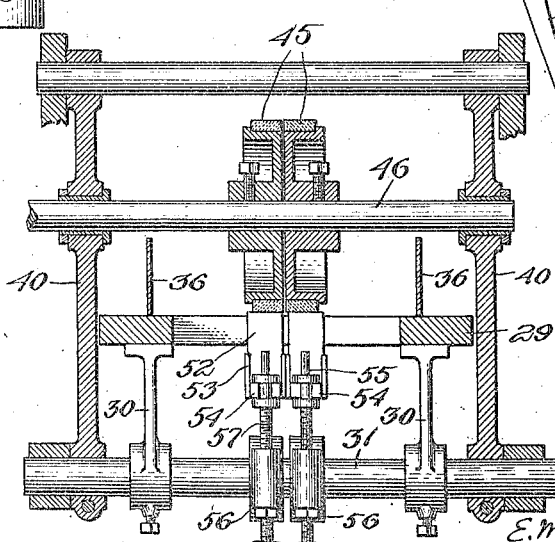

UNITED STATES PATENT OFFICE.

ELIE W. LABOMBARDE, OF NASHUA, NEW HAMPSHIRE.

TAPING-MACHINE.

1,161,228.  Specification of Letters Patent.  Patented Nov. 23, 1915.

Application filed October 28, 1910. Serial No. 589,607.

*To all whom it may concern:*

Be it known that I, ELIE W. LABOMBARDE, of Nashua, in the county of Hillsboro and State of New Hampshire, have invented certain new and useful Improvements in Taping-Machines, of which the following is a specification.

Heretofore, in the manufacture of receptacles having tape carrying bails, it has been the practice to apply and fasten the strips of tape by hand, the ends of the strips being tied or knotted. This operation is necessarily slow.

The object of the present invention is to provide an automatic machine for applying and fastening the bail tapes to the bodies of receptacles of various kinds, the invention being, however, especially applicable to the manufacture of ice cream boxes which are made of paper and having carrying bails composed of strips of tape.

The invention is illustrated as embodied in a machine which supplies the body receptacles in the form of flat paper blanks, one by one, to mechanism which automatically cuts strips of tape from a reel or roll, carries the two ends of each strip through apertures in each blank, and glues said ends to secure them in place; all this being done before the blanks are folded up to make boxes or pails.

The machine illustrated has developed a speed of production of nearly 4,000 an hour, and has been designed to supply blanks, with attached tape handles, to the folding machine described and claimed in my application 479,827, filed February 24, 1909. I wish to be understood, however, as not limiting myself to the production of ice cream boxes or pails, since the mechanism for applying and fastening the strips of tape may be employed in connection with blanks suitable for other kinds of receptacles and made of other kinds of material than the kind of paper of which ice cream boxes are usually composed. Therefore the term "blanks" as employed in the description and claims, is to be understood as used for purposes of description only, and not as a limiting term.

My invention consists in the construction and combination of parts substantially as hereinafter described and claimed.

Of the accompanying drawings which form a part of this specification,—Figure 1 is a side elevation of the complete machine, omitting however, some of the parts the proportions of which would prevent their being indicated in said figure without confusion because of their relatively small size. Fig. 2 is a plan view of so much of the machine as is shown at the left of the central portion of the machine. Fig. 3 is a plan view of the right end portion of Fig. 1. Figs. 2 and 3 are on a larger scale than Fig. 1. Fig. 4 represents a longitudinal section on line 4—4 of Fig. 2. Fig. 5 represents a longitudinal section on line 5—5 of Fig. 3. Fig. 6 is a detailed side elevation of a support which is arranged parallel with the conveyer belts, in order that the side portions of the blanks may be supported. Fig. 7 is a transverse section of the glue box. Fig. 8 is a detailed side elevation of the mechanism for imparting intermittent rotation to the feed roll. Fig. 9 represents a section on line 9—9 of Fig. 1 but on a larger scale. Figs. 10 and 11 are detailed views of parts of the mechanism for supporting the blank table. Fig. 12 is a detailed elevation partly in section of the means for locally applying spots of glue. Fig. 13 is a plan view, partly in section, of the glue applying mechanism. Fig. 14 represents a section on line 14—14 of Fig. 13. Fig. 15 is a plan view of one of the blanks, the tape or handle which is to be applied to said blank being indicated by dotted lines. Fig. 16 is a perspective view of a complete article after the tape has been applied thereto and the blank has been folded up and tucked in. Fig. 17 is a plan view of the tape applying parts, which parts are omitted from Figs. 1 and 2 because of their being relatively small. Fig. 18 is a detailed plan view showing some of the parts of Fig. 17 in different positions. Figs. 19 and 20 are detailed views representing the tape tucking tongues in different positions. Fig. 21 is a detailed view hereinafter referred to. Fig. 22 represents a section on line 22—22 of Fig. 17 on a still larger scale. Figs. 23 to 34 inclusive are detailed views of various parts of the taping mechanism shown in Figs. 17 and 22. Fig. 35 represents a section on line 35—35 of Fig. 5. Fig. 36 is a detail elevation of the mechanism for wiping the inserting fingers.

Similar reference characters indicate the same or similar parts in all the figures.

The frame of the machine comprises side members 25 supported by suitable legs 26 and connected together by two transverse tie bars 27 and certain rods and shafts hereinafter described.

Rising from the frame at one end are two standards 28 which support the primary feeding mechanism.

The blank support or hopper comprises an inclined table 29 rigidly mounted on brackets 30 secured to a rod 31 the ends of which are gripped in split bearings 32 at the outer ends of two arms 33 the inner ends of which have split bearings 34 clamped on a rod 35. To guide blanks of varying widths on said table, I provide side guides 36 which rise from the top of the table and are adjustable laterally as by pins 37 projecting from the outer sides of the guides and through blocks 38 secured to the sides of the table, set screws 39 holding the pins and the guides in their laterally adjusted positions. The blanks are fed singly from the top of a pile on the table, by intermittently operated friction roll feed mechanism to a pair of positively driven nipper rolls as hereinafter described; to secure the best results in spite of different kinds and conditions of blanks, it is desirable that the angle of inclination of the table may be conveniently adjusted without altering the relationship of its lower end to the friction feed roll, or to vary that relationship, or to change the distance between the table and the said nipper rolls. These various adjustments may be effected by the following structure:—The rod 31 is connected by links 40 with a rod 41 mounted in the upper ends of two uprights 42 (Fig. 9) adjustably secured, as by set screws 43, on the inner ends of two rods 44 which are mounted in the standards 28 in alinement. The intermittently actuated friction feed roll 45 is secured to a shaft 46 mounted in bearings provided in the links 40, and the shafts 47 of the continuously driven nipper rolls 48 are mounted in the standards 28, one shaft being preferably mounted in sliding blocks 49 yieldingly acted on by springs 50 which may be adjusted by set screws 51. It will now be understood that, by loosening and tightening the various split bearings and set screws described, the table may have its angle of inclination changed, and its lower end may be set more or less under the feed roll, and the table and feed roll can be set at the proper elevation above the nip of the rolls 48.

In order that the space for the ejection of the single blanks may be varied to suit varying thicknesses of material, and to compensate for wear, so that no blank can slide down the table until fed by the roll 45, I preferably provide the lower part of the table with one or more adjustable blocks 52 which are, desirably, of rubber. In Fig. 5 the lower end of the table is indicated by dotted lines as cut away to form an opening or recess through which the blocks 52 project. Each block is mounted in a holder 53 (Figs. 9 and 35) carried by a plate 54 which is guided on a pin 55 rising from a collar 56 adjustably mounted on rod 31 and vertically adjusted by a screw 57 fitting a threaded bearing in said collar. The reasons for employing blocks 52 of rubber or equivalent material is to provide the necessary friction to prevent a thin blank sliding down the table. And the reasons for providing two blocks which are independently adjustable is that the retarding effect should be either by a wide surface or in at least two laterally separated locations. As it is difficult to cut rubber squarely, and as it frequently wears away unevenly, the provision of the two adjustable hold-back members 52 enables the machine to always present, in operation, efficient means for preventing the sliding down of a thin blank, or the distortion of a blank out of a straight line of feed by the roll 45. If the roll could act along one line on the blank while a single hold back acted along a different line, there would be a distortion of feed which is prevented by the two blocks side by side. Another reason for providing two adjustable blocks 52 is that the feed roll 45 is preferably made in two sections which may be set more or less apart on the shaft 46 according to the width and specific shape of the blanks. When the sections of the roll are spaced apart, the retarding blocks should be correspondingly spaced by adjusting the collars 56 along rod 31.

The means for intermittently actuating the feed roll shaft 46 comprises the following devices and connections: A ratchet 58 is secured to the shaft 46, and said ratchet is engaged by a spring held pawl 59 carried by a collar 60 loose on said shaft and having a pinion 61. A rack 62 is held in mesh with said pinion by a guide 63, said rack being connected with an arm 64 of a rock shaft 65 which is mounted in bearings at the upper ends of the standards 28. The rock shaft has another arm 66 which is connected by a rod 67 to a strap on an eccentric 68 secured to one end of a shaft 69. The other end of said shaft has a gear 70 meshing with a pinion 71 on the main power shaft 72 having a belt wheel 73. The arm 64 is slotted for the connection of the rack bar 62 so that the amount of throw imparted to the rack may be varied and consequently the amount of rotation given to the feed rolls may be according to the length of blanks being fed.

The nipper rolls have intermeshing pinions the lower one of which meshes with a gear 74 carried by a stud shaft having a pinion 75 meshing with the gear 70 and said nipper rolls are consequently rotated continuously ready to take each blank as it is fed from the table and advance or forward it to the secondary feeding mechanism presently described.

To prevent the momentum of the feed wheel from carrying it so far as to start to feed a second blank, I provide a brake for the feed wheel shaft, said brake as illustrated comprising a flexible friction band or loop 76 secured at one end to a stud 77 carried by one of the links 40 and stretched tightly over said shaft. Of course the other link 40 may have a stud for another brake band, if desired. The upper end of the loop is attached to the stud 77 in such manner that, by rotating the stud and securing it as by a nut 78, the loop may be wound up on the stud to increase the binding of the other end of the loop on the feed wheel shaft.

To properly direct the blanks from the primary feed and nipper rolls to the horizontally acting secondary feed which carries the blanks in properly spaced relationship to the devices for further treatment of the blanks, I provide curved guides or fingers 79 which are secured to a rod 80 which is, in turn, secured to the standards 28 near the bases thereof.

Mounted in bearings in brackets projecting from one of the side members 25 of the frame, is a shaft 81 for transmitting power to the different operating portions of the machine beyond the primary feed. Said shaft is driven through the gearing (Figs. 1 and 3) comprising a spur pinion 82 meshing with gear 70, said pinion being mounted on a stud shaft 83 and having a bevel pinion 84 meshing with a bevel pinion 85 at one end of the shaft 81.

The blanks which are detached singly from the supply table, by the mechanism described, are delivered by the nipper rolls to continuously operating secondary feed mechanism which carries the blanks to other mechanisms the first of which, in the machine illustrated, comprises glue applying devices. In order that the blanks shall be properly spaced so that their flaps can never overlap as they pass through the machine, and also to allow time for them to be momentarily halted for the treatments hereinafter described, it is essential that the second feed shall carry the blanks at a speed as high as the operation of the succeeding operations thereon will permit, and properly spaced so that the flaps of adjacent blanks can never interfere with each other. In other words, the supply of blanks by the primary feed must be slow relatively to the speed of movement of the secondary feed, to produce the blank spacing necessary, and this relationship is obtained by the provision of a primary feed which acts intermittently while the secondary feed acts continuously.

I will now describe the secondary feed mechanism.

The blanks are delivered by the curved guides 79 to the nip of upper and lower belts 86, 87, carried by pulleys 88, 89, secured to shafts 90, 91 having intermeshing pinions 92. The lower shaft 91 also has a pinion 93 meshing with pinion 82 to be driven thereby. The upper belt 86 is a long one, the other end being mounted on a pulley 94 on a shaft 95 at the delivering end of the machine (Figs. 1, 2 and 4). The lower belt 87 is relatively short, its front end being supported by a pulley 96 mounted loosely on a rod 97 supported by the side members of the frame, the upper stretch of said lower belt running along a supporting shoe or strip 98 supported by brackets 99, one bracket being mounted on the rod 97 and the other on a rod 100 adjacent shaft 91. These two belts 86, 87, feed the blanks first to the glue applying devices and then to the tape attaching mechanism, the blanks being properly spaced during such secondary feed movement.

Two standards 101 rising from the side members of the frame support the glue applying mechanism.

A tie rod 102 connecting the standards 101 supports two brackets 103. Two glue boxes 104 are provided, each having at one end a pin 105 engaging a lateral recess in a bracket 103 (see Figs. 5, 13 and 14) and at the other end inclosing, and supported on the hub of, a wheel 106 secured to a shaft 107 which is given a slow intermittent rotary motion by mechanism hereinafter described. The top of the box has a removable cover 108, and a false bottom 109 is secured rigidly at one end and is of suitable resilient metal, and is supported near its free end which is close to the wheel, on a screw 110 tapped through the bottom of the box, the head of the screw being protected by a spring guard 111. The width of the false bottom is such as to fit the inner sides of the box and the wheel 106 also closely fits the sides of the box, so that the glue in the box is supported on the yielding bottom and is prevented from escaping at the front by the close fit of the wheel. By adjusting the false bottom by means of the screw, the thickness of the film of glue carried out on the periphery of the wheel 106 may be nicely regulated. Preferably said periphery is slightly roughened.

The intermittent rotation of the glue wheel shaft 107 is obtained by a pawl 112 engaging a ratchet 113 secured to said shaft. Said pawl is carried by an arm 114 pivoted on the shaft, the arm being connected by a link 115 with a crank disk 116 secured to a shaft 117. The disk 116 is preferably constructed as a sprocket, driven by a chain 118 from a sprocket 119 secured to a shaft 120, said shaft having also a bevel gear 121 driven by a bevel pinion 122 on shaft 81. The pawl and ratchet mechanism described, imparts a slow rotation to the shaft 107 and the two glue wheels 106 in the direction of the arrow in Figs. 5 and 7 to present freshly coated surfaces to the action of the transferrers which convey glue to the small pads which place small spots of glue on those portions of the blanks where the ends of the tapes are to be later placed. As the two mechanisms are alike, a description of one will suffice for both. Each transferrer comprises a small roll 123, preferably of rubber or equivalent yielding material, mounted on a pin 124 projecting from a block 125 mounted to reciprocate in horizontal ways formed in a bracket 126 mounted on a tie rod 127. The pin 124 passes through a slot in an arm 128 depending from a rock shaft 129 said rock shaft having an arm 130 provided with a roll which is actuated by a cam 131 on the shaft 117. One or more springs 132 normally hold the roll of arm 130 in contact with the cam 131 and the transferrer rolls in contact with the glue wheels 106. The object of the horizontal ways for the transferrer rolls is to insure the proper path of travel thereof under the flat undersurfaces of the pads 133. Each of said pads is carried at the lower end of a pin 134 mounted to slide vertically in a bracket 135 adjustably secured to a vertically movable rod 136. The pin is yieldingly held in its lower position by a spring 137, the limit of lower position being adjustably determined by one or more set nuts 138. The pad-carrying rod 136 is supported at its ends in slides 139 mounted in vertical ways in the standards 101, said slides having pins entering slots in arms 140 of a rock shaft 141, the latter having another arm 142 provided with a roll and actuated by a cam 143 on the shaft 117. One or more springs 144 hold the pad-carrying rod 136 in a plane so that the pads will be well above the path of the blanks and in a plane to permit the transferrer rolls 123 to pass under and coat the bottoms of the pads with glue. The cam 143 acts however at the proper times to depress the slides 139 and the pads so that the latter will deposit small patches of glue upon the blank below. To support the blank against the pressure of the pads, I provide small tables 145 secured to the rod 127. Each table is formed with a recess 146 (Fig. 12) so that, if no blank should be over the two tables when the pads descend, no glue will be deposited. The pads do not descend far enough to contact with the bottoms of the recesses, but only far enough to press on blanks supported by the edges of the tables.

It is desirable that each blank shall be temporarily arrested in the exact position for receiving the spots of glue applied by the pads. The proper location for said spots of glue is indicated at $a\ a$ in Fig. 15, close to the slits $a'$ through which the ends of the tapes are to be passed by the mechanism later described. The secondary feed belts do not grip the blanks at this point so tightly as to prevent slipping if the blanks are positively stopped. To effect the temporary stoppage of each blank, I provide two fingers 147 having their shanks 148 adjustably secured in blocks 149 which are themselves adjustably mounted on a vertically movable carrying rod 150. These fingers can be so adjusted as to engage the advancing edge of a blank at two points, regardless of the shape of said edge, and hold the blank while the belts continue to travel and during the operation of the glue pads. The finger carrying rod 150 is supported at its ends in slides 151 mounted in vertical ways formed in brackets 152 carried by the side members of the frame, each slide being depressed by a spring 153 and having a roll 154 at its lower end riding on a cam 155 secured to shaft 120. The two cams 155 and the springs 153 control the movements of the rod 150 so that the fingers 147 are interposed in the path of the blanks at the proper times, and long enough, for the pads to apply the spots of glue. As soon as the fingers rise, the blanks are again moved by the secondary feed belts to the devices which cut off a strip of tape of just the right length, and insert its ends through the slits $a'$ of each blank, and fasten the ends down on the spots of glue.

It is sometimes desirable, when wide blanks are to be taped, to provide supports for the wings or side portions of the blanks. Such supports may comprise wires 156 suitably supported at their ends. There are also two sets of adjustable side edge guides 157 L-shaped in cross section, each having a flaring entrance end. Each of these guides is carried by a pin 158 projecting from a block 159 adjustably secured on tie rod 127. The other set of guides consists of a pair of elongated vertical plates 160, each carried at the inner end of a rod 161 adjustably mounted in a bracket 162 secured to a side member of the frame. Each plate 160, at the end nearest the gluing devices, is curved outwardly, and at its other end has a horizontal flange 163 which is inclined upwardly in the direction of travel of the blanks to insure the proper entrance of the entire blank to the taping mechanism. This mechanism is supported on cross bars 164, by means of uprights 165, the bed frame of the mechanism being indicated at 166. The top plate 167, over which the blanks pass, is suitably supported, two of the corners of said plate being shown as resting on blocks 168. The operating parts of the taping mechanism are mainly located between the bed-frame and the top plate. Before describing this mechanism, I will refer to the devices which arrest each blank in position to have the tape applied thereto. Projecting from the blocks 168, are brackets 169, having bearings for a rock shaft 170, (see Figs. 2 and 4). Said rock shaft has an arm 171, provided with a roll, which bears upon a cam 172, mounted on the main shaft 173, of the taping mechanism. Blocks 174 are adjustable longitudinally of the shaft 170, and in said blocks are adjustably mounted arms 175, having downwardly projecting fingers 176. The cam 172 operates at such times as to hold the fingers 176 in arresting position across the plane of movement of the blank to hold said blank stationary long enough for the tape ends to be applied through slits of the blank, and then release the blank to permit each to be carried forward again by the continuously operating upper belt 86, the blank being, of course, between the top plate 167 and said belt 86.

The main shaft 173 is provided with a sprocket engaged by a chain 177, (see Fig. 2). Said chain is mounted on a sprocket carried by a shaft 178, having a gear 179 meshing with a pinion 180, carried by a stud shaft mounted in one of the side members of the frame, and having a bevel pinion 181, meshing with a bevel pinion 182 on the shaft 81. The stud shaft carries also a gear 183 which meshes with a pinion 184 on a shaft 185, (see Fig. 4), said shaft 185 having a gear meshing with a gear 186 on the shaft 95, (see Fig. 2).

The top plate 167 is formed with a transverse opening as best shown in Fig. 2, or is otherwise formed to permit the operation of applying the tape, as hereinafter described. To prevent the blanks from catching on the far edge of said opening, I may employ thin guide strips 187 crossing the opening. To guide the edges of the blanks, I employ guides 188, each having a slotted side arm 189, through which a set screw 190 passes to secure the guide to the plate.

In order that the pressure of the belt 86 on the blank on the top plate shall be greater when the arresting fingers move to the position shown in Fig. 4 than when said fingers are down to arrest the blank, I provide one or more pressure rolls above the operating stretch of said belt, which roll or rolls will be automatically raised and lowered. One of such rolls is shown in Fig. 4 at 191,—another at 192. The roll 191 is carried by an arm 193, mounted loosely on the cross rod 194ˣ. The other roll 192, is carried by an arm 194 of the rock shaft 195 mounted in bearings provided in uprights 196 rising from the bed 166. At one end (see Fig. 2) said rock shaft is provided with an arm 197 which is actuated by a cam 198 at the end of the shaft 173. The rock shaft 195, has another arm 199, which is connected by a link 200 to an arm 193. These connections are such that the rock shaft is acted upon at the proper time by the cam 198, to lift the roll 192 just as the arresting fingers 176 move downward. And the connections described also cause the roll 191 to be lifted at the same time. The necessary pressure of the rolls may be effected by means of a spring 201 connecting a pin of shaft 195 to a fixed point provided by the top plate (see Fig. 2). Preferably said top plate is provided with slots or small openings, in which are suitably mounted rolls 202, (see Figs. 4 and 22), directly beneath the rolls 191, 192, so that the blank under the belt 86 will not be held back by friction with the top plate when the blank is to be advanced.

The upper stretch of the belt 86 passes under an idle roll 203 mounted on the cross rod 194ˣ, (see Figs. 1 and 4). The said belt may be kept at the proper tension by one or more rolls 204 carried by adjustably mounted arms 205, one of said arms 205 being mounted on cross rod 194ˣ, and the other on another cross rod 206.

While each blank is held, in arrested position, on the top plate, the two ends of a length of tape $b$ are tucked through the slits $a'$ and pressed down on the spots of glue $a$ by tuckers or inserters, the passage of which is permitted by the shape of the slits $a'$, said shape being such that tongues are formed in the blanks, said tongues yielding as shown in Fig. 20, when the inserters pass through. This involves a novel structure of blank and box which form the subject matter of another application for patent. When the blank is folded as shown in Fig. 16, by the machine claimed in my application 479,827 hereinbefore referred to, the portions which carry the glue and have the slits $a'$ are shielded by other portions of the box. In other words, the ends of the box are composed of double walls with unslitted portions covering the inside surfaces of the slitted walls so that the contents of the box can not come in contact with the glue, or the tape ends, or escape through the slits.

The top plate is omitted from Fig. 17, to show the mechanism for drawing a length of tape, cutting it off, and inserting its ends through the slits $a'$. Two guide rods 207 are supported by the blocks 168, (see Fig. 17) and pass through a center block 208 the top of which is in a plane to firmly support the central portion of the front edge of the top plate. Mounted on the rods 207 are two slides 209, 210, each connected by a link 211, (see Fig. 26) with the outer end of a lever 212 pivoted on a post 213 rising from the bed 166, (see Fig. 22). Rigid with each lever 212 is an arm 214 connected by a link 215 with the upper end of an angle lever 216. The ends of the links 215 have universal joint connections with the arms 214 and levers 216. Each lever 216 is pivoted at 217 and has a roll 218 bearing on a cam 219 carried by shaft 173. Each lever is moved in opposition to its actuating cam by a spring 220 coiled on post 213 and having one end fixed and the other end connected to arm 214. The two levers 212 are actuated by their cams and springs to move the slides 209, 210 simultaneously toward and from the center block 208, to measure off the length of tape to be attached to each blank. The cams 219 act to move the slides toward each other and the springs 220 act to move the slides apart. Therefore, by adjustably limiting the outward movements of the slides, the length of tape is determined to suit different sizes of blanks. I have illustrated (see Figs. 17, 23 and 27) collars 221 which surround one of the guide rods 207 for this purpose, said collars being carried by, and adjustable with, the post-supporting blocks presently described.

The slide 209 (see Fig. 26) has a fixed top plate or jaw 222, and below it a pivoted gripper or jaw 223 having a cam-shaped or eccentric periphery 224 which is preferably roughened. A spring 225 holds the gripper or jaw 222 to prevent backward movement of the tape between it and the fixed jaw 222. A strip of tape b is led from a suitably supported coil or reel or other source of supply not shown, between the jaws 222, 223, and when the slide 209 moves in the direction of the arrow near it in Fig. 26, it pulls the tape along with an end projecting to be transferred to and grasped by the nipper-jaws of slide 210. The top jaw 226 of this slide is fixed and transversely corrugated. The coacting lower jaw 227 is also transversely corrugated and is carried by a vertically movable plunger 228, pressed upwardly by a spring 229. The lower end of the plunger is reduced and projects below the bottom 230 of the socket portion of the slide and has pivoted thereto a lever 231 having a heel 232. A spring 233 holds the latch normally in the position shown in Fig. 26. In said Fig. 26, the two slides have not reached their positions of close proximity; but as they continue to advance toward each other, the contact of the tip of latch 231 with a fixed lug 234 causes the heel 232 to fulcrum against the bottom 230 in such manner as to pull the plunger down and separate jaw 227 from jaw 226, so that the projecting end of the tape carried by slide 209 may enter between said jaws. At the last of the advance movement of the jaws, the tip of the latch 231 slips over the top of lug 234 and spring 229 immediately snaps jaw 227 to close on the end of the tape. When the slides then retreat from each other, the latch 231 swings on its pivot and rides over lug 234 without opening the jaw 227, so that the tape is drawn across the machine, the pivoted cam-shaped jaw 223 of slide 209 permitting the tape to run quite freely in this direction, said slide of course, at the same time, moving backwardly. As described, the arms 212 actuate the grippers carried by slides 209, 210, so that they simultaneously approach the longitudinal middle or center of the machine at which point the block 208 (Fig. 26) is located. Of course, when the gripper blocks return, they simultaneously move away from said middle or center. One gripper pulls the tape from the source of supply, and the other gripper takes it from the first gripper, and, consequently, each gripper has to travel but one-half of the distance that would be required if one gripper were to do all of the pulling off from the source of supply. Owing to this fact that the two grippers move toward and from each other, one having means for pulling tape from the supply, and the other having means for taking the tape from the first one, the operation of the machine is much faster than if one gripper were to be relied upon for doing the entire pulling and measuring. In Fig. 17 the tape is not shown as extending between the jaws of the slides because that figure is drawn to show the positions of the parts an instant later, when the tape has been cut and the cut length has been shifted slightly aside by mechanism presently described. The cutter which severs the tape near the jaws of slide 209 will be described in detail after first explaining the mechanism which transfers the length of tape to position to have its ends tucked through the slits of the blanks, because the act of cutting occurs after the commencement of the transferring motion.

Figs. 4, 17, 18, 22, 23, and 27 illustrate the mechanism for positioning each length of tape that is to have its ends secured to the blanks. The bed frame 166, near its front edge, is formed with a groove 235 to receive heads 236 of bolts which adjustably secure two blocks 237, 238 in place on the bed frame. Each of said blocks has a bearing 239 for an upright post 240 having a pin 241 at its upper end. The pin is a wide one merely for strength, one edge being in line with the axis of the pin so that when the ends of the tape are carried around said pins as presently described, there will be no material change in the lengthwise strain on the tape. The lower end of each post has an arm 242 connected by a link 243 with a lever 244 pivoted to ears 245 of the block 237 or 238, said lever having a roll 246 bearing on a cam 247 on shaft 173. A spring 248 (see Fig. 21 and dotted lines in Fig. 22), is coiled about the post, and so connected as to return the post after it has been oscillated by its actuating cam 247. The links 243 have universal joint connections with the arms 242 and levers 244. The cams are of sufficient length to perform their functions when the blocks 237, 238 are adjusted considerably from their positions shown in Fig. 17. The connections just described are such as to swing the posts a little more than 20 degrees, so that arms 249, 249×, carried by said posts will in one extreme position stand about as shown in Fig. 18, and in the other extreme position stand very nearly as shown in Fig. 17. The mechanisms carried by the two arms 249, 249× are substantially alike, except that one of them includes shearing or cutting devices to sever the tape.

I will first describe the mechanism carried by the arm of the post of block 237, including the cutting devices. Referring to Figs. 17, 18, 27, 28, 29, 30, and 31, it will be seen that the outer end of the arm 249 carries a barrel 250, the upper end of which has a lateral web 251 to the outer end of which is suitably secured, as by brazing or otherwise, a block 252. Said block 252, might, however, be integral with the web 251. Secured to the top of web 251 by a screw 253, is a block 254, having a lateral projection to form an upper fixed jaw, 255, the under surface of said jaw being corrugated only in a transverse direction for a purpose hereinafter described. Mounted in the barrel 250 is a plunger 256 having its upper end transversely corrugated, as best shown in Fig. 31, this corrugated upper face of the plunger constituting a movable jaw, to coöperate with the fixed jaw 255. The plunger is pressed upwardly by a spring 257, and the reduced lower end of the plunger passes through the bottom of the barrel and has pivoted thereto a lever 258, having a heel 259. An aperture in the head of the lever receives one end of a spring 260, the purpose of which is to hold the lever 258 normally in the position shown in Fig. 31. A lug 261, (see Fig. 23) stands in the path of movement of the lower end of lever 258 as the lever swings about the center of bearing 239. When this member reaches the position shown in Fig. 17, the lever 258 engages lug 261, and owing to the heel 259, bearing against the bottom of the barrel, continued movement of the arm and barrel pulls the plunger 256 downwardly, so as to open the jaws to enable them to grasp the tape which, at this time, is stretched directly between the gripping jaws of the slides 209, 210. During the last of this swinging movement of arm 249, the tip of lever 258 passes beyond the lug 261, and permits the spring 257 to force the plunger jaw upwardly to grip the tape. Of course, when the arm swings to the position shown in Fig. 18, the lever slips idly over lug 261, (Fig. 23) said lever swinging in the direction of the arrow in Fig. 31, so as not to actuate the plunger, and then the spring 260 returns said lever 258 to normal pendant position.

Referring to Figs. 32, 33, and 34, it will be seen that the other arm 249× carries jaw members which are, in all substantial respects, the same as the jaw members just described. In the three figures mentioned, the parts illustrated are designated by the same reference characters as the parts just described, with the addition of the exponent "×." The jaws of the two swinging posts operate simultaneously to grasp the tape, and then shift it to the position shown in Fig. 17, and then to the position shown in Fig. 18, the latter figure showing that the tape is carried around the pins 241 to a position substantially at a right angle to the line of feed of the tape as it was drawn from the source of supply. But of course the tape must be severed to permit this to be done. Referring again to Figs. 27, 28, 29 and 30 in connection with Figs. 17 and 18, it will be seen that, secured rigidly to one side of the block 252 is a fixed shear-blade 262. Mounted in said block is a pin 263, on which is pivoted a movable shear-blade 264, the contact between the two blades being preserved by the spring 265 held between the movable blade 264 and the inner face of a lever 266, which is pivotally mounted on the pin 263. The movable blade 264 has a pin 267 projecting from it under the jaw head of the plunger 256, so that every time that the plunger is positively depressed, the movable shear-blade will be positively moved downwardly.

As has been described, the plunger jaw 256 opens as it approaches the taut tape. The construction just described also opens the shears so that the tape will enter between the shear blades. The lever 266 carries a pin 268 which passes through the spring 265 and into the shear-blade 264, so that the mechanism to positively actuate the lever 266 in the direction of the arrow in Fig. 29 will positively actuate the movable shear-blade to sever the tape. Said Fig. 29 shows the position of the parts with the shears closed. As has been explained, the swinging movement of the barrel 250 from the position shown in Fig. 17, causes the lever 258 to be actuated to open the gripping jaws; consequently, the movable shear-blade 264 is depressed at the same time. On the return swinging movement of the barrel, the plunger continues to grasp the tape, but the closing movement of the plunger jaw does not operate the movable shear-blade. This closing movement of the shear-blade is positively effected during the first of the return swinging movement of the shears and is effected by the lug 269 (see Figs. 23 and 27) which is carried by an arm 270 pivoted at 271 to the block 237, said arm being normally held against a stop pin 272, by a spring 273. When the lever 266 is moving in the direction of the arrow in Fig. 29, the tip of said lever engages the flat side of lug 269, and merely swings the lug aside.

When the return movement begins, the tip of the lever 266 engages the inner end of lug 269, and the said tip of the lever is thereby retarded, so that continued movement causes the lever to oscillate and positively actuate the blade 264, so as to cut the tape, this operation having been just performed when the parts reach the position shown in Fig. 17. Further movement of the posts and their arms and grippers toward the position shown in Fig. 18 will cause the tip of lever 266 to ride over the top of lug 269, the shears remaining closed until again positively opened by the opening movement of the grippers as the parts return to cut off and grip a new length of tape.

When the cut length of tape has been carried to the position shown in Fig. 18, it is in position to have its ends inserted through the slits of the blank, and I will now proceed to describe the mechanism for doing this. As shown in Figs. 17, 18 and 22, the bed frame 166 is provided with two standards, 274, in which is mounted a rock shaft 275, the ends of which are tubular, to receive extensions 276, the outer ends of said extensions carrying curved fingers or inserters 277. The extensions 276 constitute practically parts of the rock shaft, but they are adjustable in the hollow rock shaft so as to space the fingers 277 relatively to each other, according to the width or size of blank that is being taped. The extensions are splined in the portion 275, and may be held in their longitudinal adjustments by set screws 278. The portion 275 of the rock shaft is provided with an arm or arms 279 to which is pivoted a link 280, the other end of said link being connected to a lever 281 pivoted at 282, and having its lower end in the path of the cam 283 secured on shaft 173. The timing of the operation of cam 283 is such as to oscillate the rock shaft so as to cause the curved fingers 277 to move upwardly against the under sides of the tape near to the points where the ends of the tape are held by the swinging jaws in the position shown in Fig. 18, and pull the ends out from the jaws and carry said ends up through the slots in the blank, as shown in Fig. 20. It has been mentioned that the corrugations or teeth of the tape-shifting jaws extend transversely of said jaws. This enables the tape ends to be pulled out from the gripping jaws by the fingers 277, because the direction of pull, when doing so, is lengthwise of the corrugations or teeth.

The return movement of the rock shaft is effected by a spring, such as shown at 284 in Fig. 22, said spring being connected to the link 280 and to a fixed point of the frame. In the operation of this part of the mechanism, the fingers 277 move from the position substantially that shown in Fig. 19, to a point a little beyond that shown in Fig. 20.

As said fingers pull out the ends of the tape from the gripping jaws, they tuck or insert said tape ends through the slots of the blank, which, at this time, is arrested, the ends of the fingers 277 moving to a point far enough to press the ends of the tape firmly down upon the spots of glue which have been applied to the blank near the slots $a'$. This often results in some glue adhering to the ends of the fingers. I employ devices for keeping the ends of the fingers clean, and said devices will be described hereinafter.

Immediately after the fingers 277 have pulled the tape ends out from the gripping jaws, said jaws begin to return to the position shown in Fig. 17, to take a new piece of tape. I will mention here, that to adjust this portion of the machine for different widths of blanks, it is only necessary to adjust the blocks 237, 238 by means of their bolts, the heads of which are in the bed groove 235, and to then correspondingly adjust the rock shaft extensions 276. There are, however, above the top plate 167, some pressers which also need to be correspondingly adjusted. These pressers, (see Figs. 2 and 4) comprise arms 285, which are secured to the rock shaft 195, and may be adjusted longitudinally thereof. It will be noticed in Fig. 4 that the arms 285 project forwardly from the shaft 195, while the roll 192 is at the rear of said shaft. Therefore, the arms 285 are raised when the roll 192 and the roll 191 are depressed. And of course, when said rolls are raised, the arms 285 are depressed. This occurs at the same time that the fingers 176 arrest the movement of the blank. Each of said arms has an elastic foot or pad 286 to bear upon the blank and press the blank on the top plate. This pressure occurs beyond the edges of the conveyer belt 86, and the blank is thereby held against any possible shifting by the operation of the inserting fingers 277. Each arm also has a bifurcated finger 287 having a grooved or rounded end surface to bear upon the blank on each side of the slot through which the inserting finger passes.

After the ends of the tape have been inserted as described, and "tacked" by the ends of the fingers pressing the tape on the spots of glue, the arresting fingers 176, and the pressers described release the blank, and it is started forward, and its under surface acted upon by an endless belt 288 (see Fig. 4) said belt being mounted on a pulley 289 secured to shaft 185 and on a pulley 290 mounted on a cross rod 291. Preferably the upper stretch of the belt 288 is supported by a plate 292, and firm coöperation between the upper stretch of belt 288 and the lower stretch of belt 86 is secured by a roll 293 having its carrier mounted in a bracket 294, adjustably secured on an arm 295 which is rigidly supported by the cross rod 206.

The carrier of the roll 293 is yieldingly pressed downward by a spring 296.

The belts 86 and 288 deliver the taped blanks from the machine, but it is desirable that the portions of the blanks to which the tape ends have been "tacked" shall be subjected to considerable pressure, to cause the tape ends to be firmly secured. As shown by comparing Figs. 2 and 4, there are two pairs of upper and lower rolls to exert this pressure. The lower rolls 297 are carried by yokes 298, the arms of which are supported by the cross rod 299. These lower rolls may be simply idly mounted in their yokes. The upper rolls 300 are secured to a shaft 301, said shaft having a sprocket 302 at one end, said sprocket being driven by a chain 303 from a sprocket on shaft 95. The relative sizes of the pulleys and sprockets are such that the peripheral speed of the rolls 300 will be substantially the same as the speed of the belts 86 and 288. Owing to the pressure exerted on the blank as it passes between the rolls 297 and 300, the upper rolls are liable to become coated with glue which is on the upper surfaces of the blanks. To keep the rolls 300 clean, I preferably employ both scrapers and wipers. The scrapers 304 have their shanks 305 adjustably secured in blocks 306 adjustably secured to the cross rod 307. These scrapers are preferably inclined, so that glue scraped off thereby will be deflected beyond the edges of blanks traveling underneath.

The wipers comprise wicks 308, the ends of which are held in contact with the surfaces of the rolls 300 by means of flattened tubes 309. Each wick 308 rests in a reservoir or pan 310 supported by the cross rod 299. Water is placed in the pans to keep the wicks and the rolls 300 moist, so that the glue can be readily scraped off by the scrapers 304. Of course the wicks aid in keeping the rolls clean by the wiping action.

In Figs. 17 and 36, I illustrate means for keeping the ends of the inserting fingers 277 free from accumulations of glue. The under surface of each of the blocks 237, 238 is formed with ways for a slide 311, having an adjustable extension 312. The projecting end of each slide 311 is provided with a post 313, which supports a water reservoir 314, the latter having a wick-tube 315, provided with an aperture 316 in one side. The extension 312 is provided with a downwardly extending pin 317, said pin passing through a slot in a lever 318, pivoted at 319 to a fixed portion of the machine, and having the other end in position to be actuated by a cam 320, formed as a protuberance from the end of cam 247. A spring 321 connects the two levers 318 so as to operate the slide 311 in opposition to the two cams 320.

The cams 320 are so located as to actuate the levers and cause the slides 311 to move outward and return during the time that the inserting fingers 277 occupy the position shown in Fig. 19. Sufficient of the wick projects through the apertures in the wick tubes to wipe the tips of the fingers and keep said tips moist.

All of the parts which require adjustments for different sizes of blanks are provided with means to permit such adjustments to be made. For instance, the side guides 36 for the pile of blanks are adjustable by means of their pins 37, mounted in the blocks 38. The two members of the feed roll 45 are adjustable toward and from each other on the shaft 46. The glue boxes 104 may be set in proper lateral positions by means of the brackets 103, which can be secured in proper positions on the tie rod 102. The arms 128 can be adjusted on the rock shaft 129 and the glue spotters or pads are correspondingly adjustable along the rod 136, the tables 145 being adjustable along the rod 127.

All the other parts requiring adjustments are so clearly illustrated as to require no further description thereof, than has been given in connection with the description of their operations. And of course it will be understood that the relative timing of the operations of the different mechanisms is such as to cause them to act in proper sequence.

The glue spotters or pads 133 are made of requisite area to place sufficient glue upon the blanks, in the form of spots to securely hold the ends of the tape which are first "tacked" and then pressed firmly down in the manner already described.

I employ the term "tape" for purposes of brevity of description and not of limitation. Preferably the material is that which is commercially known as tape but need not necessarily be a strip of flat fabric. The term "glue" is also used herein for brevity of description and not of limitation, since any adhesive capable of retaining the tape ends may be employed.

I claim:

1. A machine of the character described, comprising a continuously movable blank carrier, glue-applying mechanism above said carrier, and automatic mechanism for inserting the ends of a piece of tape from below the carrier upwardly through apertures in the blanks and affixing them to portions of each blank where the glue is applied.

2. A machine of the character described comprising a continuously movable blank carrier, blank arresters located to operate in two different positions longitudinally of said carrier, glue spotters for applying glue to each blank when in one arrested position, and automatic tape affixers movable from position at one side of the plane of movement of the blank to the other side of such plane, said affixers being mounted to operate when the blank is in another arrested position.

3. A machine of the character described comprising a continuously movable blank carrier, blank arresters located to operate in two different positions longitudinally of said carrier, glue spotters for applying glue to each blank when in one arrested position, and automatic tape affixers mounted to operate when the blank is in another arrested position, means being provided for projecting the affixers through the blank while it is stationary.

4. A machine of the character described, comprising a continuously movable blank-carrier, glue-spotters, arresters for holding the blank during the operation of the spotters, tape-affixers, and arresters for holding the blank during the operation of the affixers.

5. In a machine of the character described, the combination with an intermittently actuated primary feed, of a continuously operated secondary feed, means for temporarily arresting each blank while engaged by the secondary feed, glue applying devices, and means for automatically affixing the ends of a piece of tape to the glue-coated portions of the blank.

6. A machine of the character described, comprising a long endless upper belt, two separated lower endless bolts, one in advance of the other, tape applying devices located between the two lower belts, and means for arresting a blank conveyed by the belts, in position to have tape applied thereto.

7. A machine of the character described, comprising upper and lower endless belts, stops for arresting a blank carried between said belts, glue-spotters for applying glue to the blank while it is arrested, means for locating the stops in operative position in advance of the operation of the glue spotters and holding them in arresting position until after the spotters leave the blank, whereby rubbing contact of the spotters with the blank is prevented, and means for automatically affixing the ends of a piece of tape to the glue-coated portions of the blank.

8. In a machine of the character described, the combination with a blank carrier, of a pair of arresting fingers movable across the plane of the blanks, glue-spotting pads vertically movable in planes at the sides of the carrier, supports for the portions of the blank which receive the pressure of the pads, means for holding the fingers in arresting position from before until after the operation of the pads, and means for automatically affixing the ends of a piece of tape to the glue-coated portions of the blank.

9. In a machine of the character described, the combination with upper and lower blank-carrying belts, of a pair of arresting fingers movable across the plane of a blank carried by said belts, glue spotting pads vertically movable in planes at the sides of the carrying belts, supports for the portions of the blank which receive the pressure of the pads, means for holding the fingers in arresting position from before until after the operation of the pads, and means for automatically affixing the ends of a piece of tape to the glue-coated portions of the blank.

10. In a machine of the character described, the combination with upper and lower blank-carrying belts, of a pair of arresting fingers movable across the plane of a blank carried by said belts, glue-spotting pads vertically movable in planes at the sides of the carrying belts, supports for the portions of the blank which receive the pressure of the pad, said fingers being adjustable to vary their distance in advance of the pads, and means for holding the fingers in arresting position from before until after the operation of the pads.

11. In a machine of the character described, the combination with a blank carrier, of a transverse rod above the carrier, a pair of blank-arresting fingers adjustably secured to said rod, means for vertically moving the transverse rod to raise and depress the arresting fingers, and means for spotting the blank with glue while it is arrested by said fingers.

12. In a machine of the character described, the combination with a support for a blank, of a continuously movable belt to bear on the top of the blank, an intermittently movable arrester to stop blanks on the support, and a presser to bear on the belt when the arrester is out of operative position.

13. In a machine of the character described, the combination with a support for a blank, of a continuously movable belt to bear on the top of the blank, an intermittently movable arrester to stop blanks on the support, and a presser to bear on the belt when the arrester is out of operative position, the support having a roll under the portion of the belt operated on by the presser.

14. In a machine of the character described, the combination with a support for a blank, of a continuously movable belt to bear on the top of the blank, an intermittently movable arrester to stop blanks on the support, and pressers movable in synchronism with the arrester to bear on the blank when the arrester is in operative position, means being provided for causing the pressers to hold the blanks positively stationary while in contact therewith.

15. In a machine of the character described, the combination with a support for a blank, of a continuously movable belt to bear on the top of the blank, an intermittently movable arrester to stop blanks on the support, a presser to bear on the belt when the arrester is raised, and pressers to bear on the blank when the arrester is down.

16. In a machine of the character described, the combination with an endless belt blank forwarder, of arrester fingers beyond the edges of the belt and movable to and from position across the plane of movement of the blanks, pressers movable to and from position to bear on the blanks in unison with the arrester fingers, and means for operating on the blanks while they are held by the fingers and pressers.

17. In a machine of the character described, the combination with an endless belt blank forwarder, of arrester fingers beyond the edges of the belt and movable to and from position across the plane of movement of the blanks, pressers movable to and from position to bear on the blanks in unison with the arrester fingers, and means for affixing a tape to each blank while it is held by the fingers and pressers.

18. In a machine of the character described, a pair of grippers movable toward and from each other to measure a length of tape, means for severing the tape, and means for fastening the end portions of the tape to different portions of a blank.

19. In a machine of the character described, a pair of sliding grippers movable toward and from each other to measure a length of tape, a cutter, a pair of transferring grippers, and means for taking the tape from the transferring grippers and fastening its end portions to different portions of a blank.

20. In a machine of the character described, a pair of sliding grippers movable toward and from each other to measure a length of tape, a cutter, a pair of swinging transferring grippers, each having relatively movable members or jaws to grasp the tape, and means for taking the tape from the latter and fastening it to a blank.

21. In a machine of the character described, the combination with continuously movable blank-carrying means, of glue spotters, blank arresters, and means for fastening the two ends of a piece of tape to the spotted portions of the blank, said blank arresters being located in positions to stop each blank in each of the two positions for receiving the glue and the tape.

22. In a machine of the character described, the combination with continuously movable blank-carrying means, of glue spotters, means for locating the ends of a piece of tape over the spots of glue, blank arresters, and means for pressing said ends on the spotted portions of the blank, said blank arresters being located in positions to stop each blank in each of the two positions for receiving the glue and the tape.

23. In a machine of the character described, the combination with a continuously movable carrier for forwarding blanks having slits, of means for applying glue to the blanks near the slits, blank arresters, and means for inserting the two ends of a length of tape through the slits of the blanks and pressing them upon the areas of glue, said blank arresters being located in positions to stop each blank in each of the two positions for receiving the glue and the tape.

24. In a machine of the character described, the combination with continuously movable means for forwarding blanks having slits, of means for applying spots of glue to the upper sides of the blanks near the slits, and means for inserting the ends of a piece of tape through the slits of each blank from below and carrying said ends over and pressing them down upon the areas of glue.

25. A machine of the character described, comprising a continuously movable blank carrier, means for temporarily arresting a blank actuated by the carrier, and tape appliers movable through the blank for automatically fastening the ends of a piece of tape to the blank while it is in arrested position.

26. A machine of the character described, comprising a continuously movable blank carrier, means for applying glue to a blank actuated by the carrier, tape measuring and severing mechanism, blank arresters and tape appliers movable through the blank for attaching the ends of a severed piece of tape to the glue on the blank.

27. A machine of the character described, comprising a continuously movable blank carrier, means for applying glue to a blank actuated by the carrier, a pair of guides having grippers for holding a length of tape, means for severing the length of tape held, a pair of grippers for taking the severed piece of tape and transferring it to a position to be applied to the blank, and inserters for carrying the ends of the tape through slits of the blank and pressing them on the blank.

28. A machine of the character described, comprising a blank carrier, means for applying glue to a blank actuated by the carrier, tape-measuring and cutting devices, movable grippers for taking the ends of the severed length of tape, and a rock shaft having fingers to carry end portions of the piece of tape through slits in the blank.

29. A machine of the character described, comprising a blank carrier, means for applying glue to a blank actuated by the carrier, tape measuring and cutting devices, a pair of vertical rock shafts having upwardly projecting pins and laterally projecting arms, grippers carried by said arms and means for acting upon portions of the tape near said grippers, after they have been swung around, to carry said end portions through the blank.

30. A machine of the character described, comprising a blank carrier, means for applying glue to a blank actuated by the carrier, tape measuring and cutting devices, a pair of vertical rock shafts having arms carrying grippers, means for preventing lateral deflection of the middle portion of the length of tape when said grippers and arms swing around, and a pair of rocking inserters to carry end portions of the tape through the blank.

31. In a machine of the character described, the combination with blank forwarding mechanism, of arresters in two locations along the route of the blanks, actuators for said arresters to interpose them in the path of blanks successively forwarded, means for applying glue to the blanks during their first stoppage, and means for affixing another article to each blank during its second stoppage.

32. In a machine of the character described, the combination with blank forwarding mechanism, of arresters in two locations along the route of the blanks, actuators for said arresters to interpose them in the path of blanks successively forwarded, means for applying glue to the blanks during their first stoppage, tape supplying mechanism, and means for affixing the ends of a length of tape to each blank during its second stoppage.

33. In a machine of the character described, the combination with a blank forwarder, of means for applying areas of glue to each blank, a pair of slides, means for reciprocating them toward and from each other, transverse of the path of movement of the blanks, grippers carried by said slides, means for severing a tape held by said grippers, means for laterally shifting the piece of tape severed, and means for fastening the ends of the piece of tape to a blank.

34. In a machine of the character described, the combination with a pair of slides, of means for reciprocating them toward and from each other, grippers carried by said slides, means for severing a tape held by said grippers, means for laterally shifting the piece of tape severed, and means for fastening the end portions of the piece of tape to different portions of a blank.

35. In a machine of the character described, the combination with a pair of slides, of means for reciprocating them toward and from each other, grippers carried by said slides, oscillating grippers for transferring the tape from the first-mentioned grippers, a cutter carried by one of said oscillating grippers, and means for fastening the ends of the piece of tape to a blank.

36. In a machine of the character described, the combination with a pair of slides, of grippers carried by said slides, a pair of levers connected to said grippers, a shaft having cams for actuating the levers toward and from each other, transferring grippers and a cutter for taking a length of tape from the first mentioned grippers, and means for fastening the ends of the piece of tape to a blank.

37. In a machine of the character described, the combination with a pair of slides, of grippers carried by said slides, a pair of levers connected to said grippers, a shaft having cams, levers actuated by said cams, links connecting the grippers' levers with the cam-actuating levers, transferring grippers and a cutter for taking a length of tape from the first mentioned grippers, and means for fastening the ends of the piece of tape to a blank.

38. In a machine of the character described, the combination with a pair of slides, of grippers carried by said slides, a pair of levers connected to said grippers, a shaft having cams for actuating the levers toward and from each other, means being provided for adjusting the throw of said levers, transferring grippers and a cutter for taking a length of tape from the first-mentioned grippers, and means for fastening the ends of the piece of tape to a blank.

39. In a machine of the character described, the combination with a pair of slides, of means for reciprocating them toward and from each other, grippers carried by said slides, one of said grippers having means for permitting a piece of tape to be drawn freely in one direction and held against movement in the other direction, means being provided for positively opening the other gripper, a spring for closing it, a cutter, and means for fastening the end portions of the cut piece of tape to different portions of a blank.

40. In a machine of the character described, the combination with a pair of slides, of means for reciprocating them toward and from each other, grippers carried by said slides, the jaws of said grippers being transversely corrugated, transferring grippers and a cutter, and means for fastening the end portions of the cut piece of tape to different portions of a blank.

41. In a machine of the character described, the combination with a pair of slides, of means for reciprocating them toward and from each other, grippers carried by said slides, means for severing a tape held by said grippers, oscillating grippers for taking the cut piece of tape and moving it laterally, the coöperating jaws of the last-mentioned grippers being transversely corrugations thereof, and fastening the ends of the tape out from the last mentioned grippers in a direction, lengthwise of the corrugations thereof, and fastening the ends of the tape to a blank.

42. In a machine of the character described, the combination with a pair of slides, of means for reciprocating them toward and from each other, grippers carried by said slides, one of said grippers being constructed to permit movement of a piece of tape freely in one direction and to bind it against movement in the other direction, the other gripper having a stationary jaw and a movable jaw, a spring for normally holding the movable jaw in position to grip the tape, a lever pivotally connected to the movable jaw and having a heel adapted to engage a stationary surface, a lug in the path of movement of said lever to cause said lever, when moving in one direction, to open the movable jaw, and means for taking a length of tape from the grippers and fastening its ends to a blank.

43. In a machine of the character described, the combination with means for measuring a length of tape, of a pair of pivoted arms having grippers for taking the length of tape each of said grippers having a stationary jaw and a movable jaw, the movable jaw having a lever pivoted to it, said lever having a heel adapted to engage a stationary surface, lugs in the path of movement of said levers to open the movable jaws, springs for closing the jaws after the levers have passed the lugs, and means for removing the ends of the tape from said grippers and fastening said ends to a blank.

44. In a machine of the character described, the combination with means for measuring a length of tape, of a pair of pivoted arms, each having a barrel and a jaw, a plunger mounted in each barrel and having a jaw, springs in the barrels for closing the jaws, each plunger extending through the barrel and having a lever pivoted to it, said lever having a heel adapted to engage a stationary surface, lugs in the path of movement of said levers to open the movable jaws, and means for removing the ends of the tape from said grippers and fastening said ends to a blank.

45. In a machine of the character described, the combination with means for measuring a length of tape, of oscillating grippers for shifting the measured piece of tape laterally, each of said grippers having relatively movable jaws to grip the tape, pins for limiting the lateral deflection of the middle portion of the tape, and means for removing the ends of the tape from said grippers and fastening said ends to a blank.

46. In a machine of the character described, the combination with means for measuring a length of tape, of a pair of posts mounted to oscillate on vertical axes, said posts having stops for the tape and having also arms, grippers carried by said arms, each of said grippers having relatively movable jaws to grip the tape, means for oscillating the posts and arms and means for removing the ends of the tape from the grippers and fastening them to a blank.

47. In a machine of the character described, the combination with means for measuring a length of tape, of a pair of blocks adjustable toward and from each other, posts mounted to oscillate in said blocks and having arms, means for oscillating the posts, tape grippers carried by said arms, and means for removing the ends of the tape from said grippers and fastening them to a blank.

48. In a machine of the character described, the combination with means for measuring a length of tape, of vertically mounted posts and means for oscillating said posts through arcs of substantially 90 degrees, said posts having arms carrying grippers, each of said grippers having relatively movable jaws to grip the tape, means for preventing movement of the middle portion of the length of tape when said posts are swung after taking the measured length of tape, and means for removing the ends of the tape from said grippers and fastening them to a blank.

49. In a machine of the character described, the combination with means for measuring a length of tape, of a pair of oscillating grippers for transferring the length of tape, one of said grippers carrying a cutter, means for positively opening the grippers, means for positively operating the cutter, and means for removing the ends of the tape from the grippers and fastening them to a blank.

50. In a machine of the character described, the combination with means for measuring a length of tape, of a pair of oscillating grippers for transferring the length of tape, one of said grippers carrying shears comprising a stationary blade and a movable blade, means for positively opening the shears and the jaws of the grippers carrying said shears, means for positively closing the said shears, and means for removing the ends of the tape from the grippers and fastening them to a blank.

51. In a machine of the character described, the combination with means for measuring a length of tape, of a pair of oscillating grippers for transferring the length of tape, one of said grippers carrying shears comprising a stationary blade and a movable blade, means for positively opening the shears and the jaws of the grippers carrying said shears, means for positively closing the shears, and means for removing the ends of the tape from the grippers and fastening them to a blank, the means for positively closing the shears comprising a movable lug adapted to engage an operating member of the movable blade when the latter moves in one direction, said lug being laterally movable to permit the operating member of the movable blade to pass it freely when moving in the other direction.

52. In a machine of the character described, the combination with means for measuring a length of tape, of a pair of oscillating grippers for transferring the length of tape, one of said grippers carrying shears comprising a stationary blade and a movable blade, a lever for actuating the movable blade, a pivotally mounted lug adapted to be engaged by said lever when the latter is moving in one direction to cause said lever to positively actuate the movable blade, said lug being free to move aside to permit said lever to pass it on the other direction without actuating the movable blade.

53. In a machine of the character described the combination with means for measuring a length of tape, of a pair of oscillating arms each having an upper stationary gripper jaw and a lower movable gripper jaw, one of the arms carrying also a movable cutter, said movable cutter having a pin projecting into the path of movement of the movable jaw to positively open the cutter blade when the jaw opens while permitting the movable jaw to close without actuating the cutter, means for positively actuating the movable cutter after the movable jaw has closed, and means for fastening the ends of the piece of tape to a blank.

54. In a machine of the character described, the combination with separated grippers for holding the ends of a piece of tape, of an inserter for each end of the tape, means for holding a blank in position, and means for operating said inserters to cause them to carry the ends of the piece of tape through different portions of the blank.

55. In a machine of the character described, the combination with separated grippers for holding the ends of a piece of tape, of a rock shaft having curved fingers at its ends, means for holding a blank in position, and means for oscillating said shaft to cause its fingers to insert the ends of the piece of tape through different portions of the blank.

56. In a machine of the character described, the combination with separated grippers for holding the ends of a piece of tape, of a rock shaft having curved fingers at its ends, means for holding a blank in position, and means for oscillating said shaft to cause its fingers to insert the ends of one piece of tape through different portions of the blank, the said rock shaft being adjustable in length to vary the distance between said fingers.

57. In a machine of the character described, the combination with separated grippers for holding the ends of a piece of tape, of a rock shaft having curved fingers at its ends, means for holding a blank in position, and means for oscillating said shaft to cause its fingers to insert the ends of the piece of tape through different portions of the blank, pressers being employed to bear on the blank to hold it against displacement when the fingers operate to insert the tape.

58. In a machine of the character described, the combination with continuously movable blank forwarding means, of glue spotters, means for fastening the ends of a piece of tape to the spots of glue, blank arresters, and pressers for firmly securing the ends of the tape after the ends have been applied to the spots of glue, said pressers being independent of the fastening means.

59. In a machine of the character described, the combination with blank forwarding means, of glue spotters, means for arresting each blank in position to be treated by said spotters, means for fastening the ends of a piece of tape to the spots of glue while the blank is arrested, and independent pressers for firmly securing the ends of the tape after the ends have been applied to the spots of glue.

60. In a machine of the character described the combination with blank forwarding means, of glue spotters, means for fastening the ends of a piece of tape to the spots of glue, and pressers for firmly securing the ends of the tape after the ends have been applied to the spots of glue, said fastening means comprising pressure rolls between which the portion of the blank having the glue spots pass, and means for keeping said pressure rolls free of glue.

61. In a machine of the character described, the combination with blank forwarding means, of glue spotters, means for fastening the ends of a piece of tape to the spots of glue, and pressers for firmly securing the ends of the tape after the ends have been applied to the spots of glue, said fastening means comprising pressure rolls between which the portions of the blank having the glue spots pass, wicks having means for holding them in contact with the rolls, and means for keeping said wicks moist.

62. In a machine of the character described, the combination with blank forwarding means, of glue spotters, means for fastening the ends of a piece of tape to the spots of glue, and pressers for firmly securing the ends of the tape after the ends have been applied to the spots of glue, said fastening means comprising pressure rolls between which the portions of the blank having the glue spots pass, scrapers bearing on the peripheries of the rolls, and means for keeping said peripheries of the rolls moist.

63. In a machine of the character described, blank forwarding means, glue spotters, means for applying the ends of a piece of tape to the spots of glue, said means comprising fingers adapted to press the ends of the tape on said spots of glue, and means for wiping the said fingers.

64. In a machine of the character described, blank forwarding means, glue spotters, a rock shaft having curved fingers adapted to press the ends of the tape on said spots of glue, and means for wiping the said fingers.

65. In a machine of the character described, blank forwarding means, glue spotters, means for applying the ends of a piece of tape to the spots of glue, said means comprising fingers adapted to press the ends of the tape on said spots of glue, and means for wiping the said fingers, said means comprising wicks movable in contact with the ends of the fingers, and means for keeping said wicks moist.

66. In a machine of the character described, blank forwarding means, glue spotters, means for applying the ends of a piece of tape to the spots of glue, said means comprising fingers adapted to press the ends of the tape on said spots of glue, and means for wiping the said fingers, said means comprising ways, wicks supported in said ways, means for reciprocating said wicks and means for keeping the wicks moist.

67. In a machine of the character described, a tape supply, a pair of grippers movable toward and from each other and having means whereby the end of the tape is taken by one gripper from the other, and means for actuating both grippers substantially the same distance of approach and recession to cause them to pull tape from the supply, whereby the tape is pulled substantially the same distance whether the grippers are approaching or receding from each other.

In testimony whereof I have affixed my signature, in presence of two witnesses.

ELIE W. LABOMBARDE.

Witnesses:
  A. W. HARRISON,
  P. W. PEZZETTI.